(12) United States Patent
Babin

(10) Patent No.: US 8,690,563 B2
(45) Date of Patent: Apr. 8, 2014

(54) HOT RUNNER MANIFOLDS INTERCONNECTED IN A COMMON PLANE

(75) Inventor: Denis Babin, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 68 days.

(21) Appl. No.: 13/560,320

(22) Filed: Jul. 27, 2012

(65) Prior Publication Data

US 2014/0027084 A1    Jan. 30, 2014

(51) Int. Cl.
    B29C 45/22    (2006.01)
(52) U.S. Cl.
    USPC ............................. 425/572; 264/328.8
(58) Field of Classification Search
    CPC ................ B29C 45/2727; B29C 45/322
    USPC ............................. 425/572; 264/328.8
    See application file for complete search history.

(56) References Cited

U.S. PATENT DOCUMENTS

| | | | |
|---|---|---|---|
| 4,219,323 A * | 8/1980 | Bright et al. | 425/572 |
| 4,620,958 A * | 11/1986 | Wiechard | 264/297.2 |
| 5,147,663 A | 9/1992 | Trakas | |
| 5,705,202 A | 1/1998 | Gellert | |
| 5,707,664 A | 1/1998 | Mak | |
| 6,851,946 B1 | 2/2005 | Plass et al. | |
| 7,122,145 B2 * | 10/2006 | Olaru et al. | 264/328.8 |
| 7,857,614 B2 * | 12/2010 | Di Simone | 425/528 |
| 7,922,472 B2 * | 4/2011 | Kuo | 425/190 |
| 8,241,032 B2 * | 8/2012 | Klobucar et al. | 425/570 |
| 8,457,773 B2 * | 6/2013 | Budapanahalli | 700/98 |
| 2010/0173038 A1 * | 7/2010 | Zha et al. | 425/572 |

FOREIGN PATENT DOCUMENTS

| | | |
|---|---|---|
| EP | 0 755 766 A1 | 1/1997 |
| EP | 1 710 070 A1 | 10/2006 |
| WO | 01/38067 A1 | 5/2001 |
| WO | 2009/054018 A2 | 4/2009 |
| WO | 2012/057990 A1 | 5/2012 |

OTHER PUBLICATIONS

"Extended European Search Report", EP Application No. 13 003 715.3, Nov. 27, 2013.

* cited by examiner

*Primary Examiner* — Tim Heitbrink
(74) *Attorney, Agent, or Firm* — Medler Ferro PLLC

(57) ABSTRACT

A hot runner apparatus includes a mold plate defining a pocket; a plurality of sub-manifolds; and a bridge manifold positioned in the pocket and between the sub-manifolds. The bridge manifold and the sub-manifolds are oriented in a common plane. The bridge manifold receives a melt from a melt source. Each of the sub-manifolds is coupled to the bridge manifold to receive the melt from the bridge manifold via a junction between an opening of a network of melt channels within the bridge manifold and an opening of a network of melt channels within each of the sub-manifolds. The sub-manifolds are urged against the bridge manifold to form a seal therebetween, when the bridge manifold and the sub-manifolds thermally expand urging the sub-manifolds against contact regions of a pair of opposing walls of the pocket. The respective opposing walls define a hollow region separated from the respective contact regions by a wall portion.

20 Claims, 18 Drawing Sheets

HOT RUNNER MANIFOLDS INTERCONNECTED IN A COMMON PLANE

FIELD OF THE INVENTION

The invention relates generally to an injection molding system and, in particular, to a hot runner apparatus having manifolds interconnected in a common plane.

BACKGROUND OF THE INVENTION

A manifold system can comprise a plurality of sub-manifolds interconnected to distribute a melt from a melt source. Orienting sub-manifolds in a common plane, rather than stacking the sub-manifolds, has certain advantages. However, orienting sub-manifolds in a common plane requires sub-manifolds to come in contact with the mold plate (that are usually colder than the sub-manifolds), an arrangement that can waste energy by increasing heat transfer from the sub-manifolds to the mold plate. Consequently, there is a need to reduce heat transfer from the sub-manifolds to the mold plate, when the sub-manifolds come in contact with the mold plate.

SUMMARY OF THE INVENTION

An aspect of the present invention provides a hot runner apparatus comprising: a mold plate defining a pocket; a plurality of sub-manifolds; and a bridge manifold positioned in the pocket and between the sub-manifolds. The bridge manifold and the sub-manifolds can be oriented in a common plane. The bridge manifold receives a melt from a melt source. Each of the sub-manifolds can be coupled to the bridge manifold to receive the melt from the bridge manifold via a junction between an opening of a network of melt channels within the bridge manifold and an opening of a network of melt channels within each of the sub-manifolds. The sub-manifolds can be urged against the bridge manifold to form a seal therebetween when the bridge manifold and the sub-manifolds thermally expand urging the sub-manifolds against contact regions of a pair of opposing walls of the pocket. The respective opposing walls define a hollow region separated from the respective contact regions by a wall portion.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures. The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
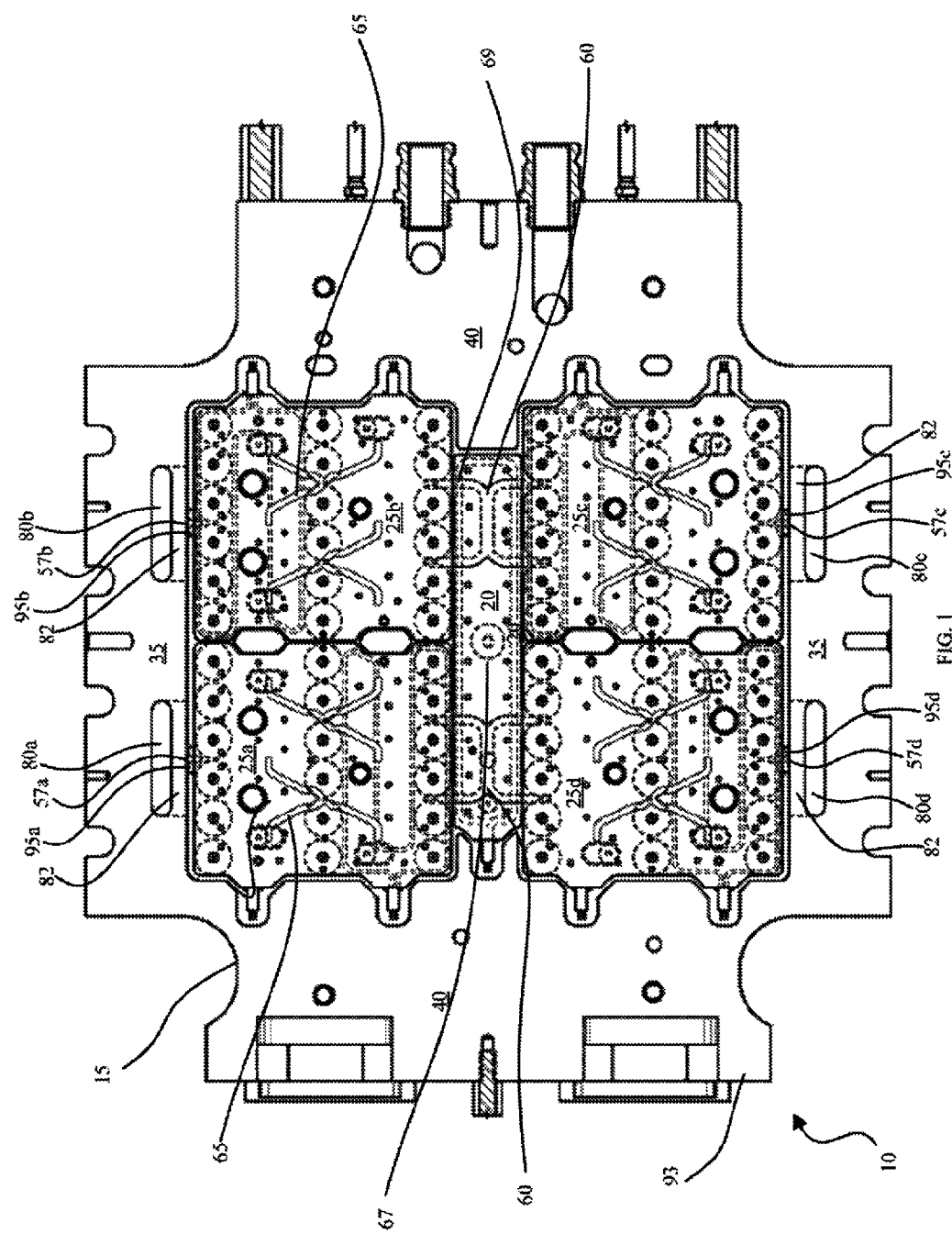
FIG. 1 is a top view a hot runner apparatus in accordance with an embodiment hereof.
Figure 2:
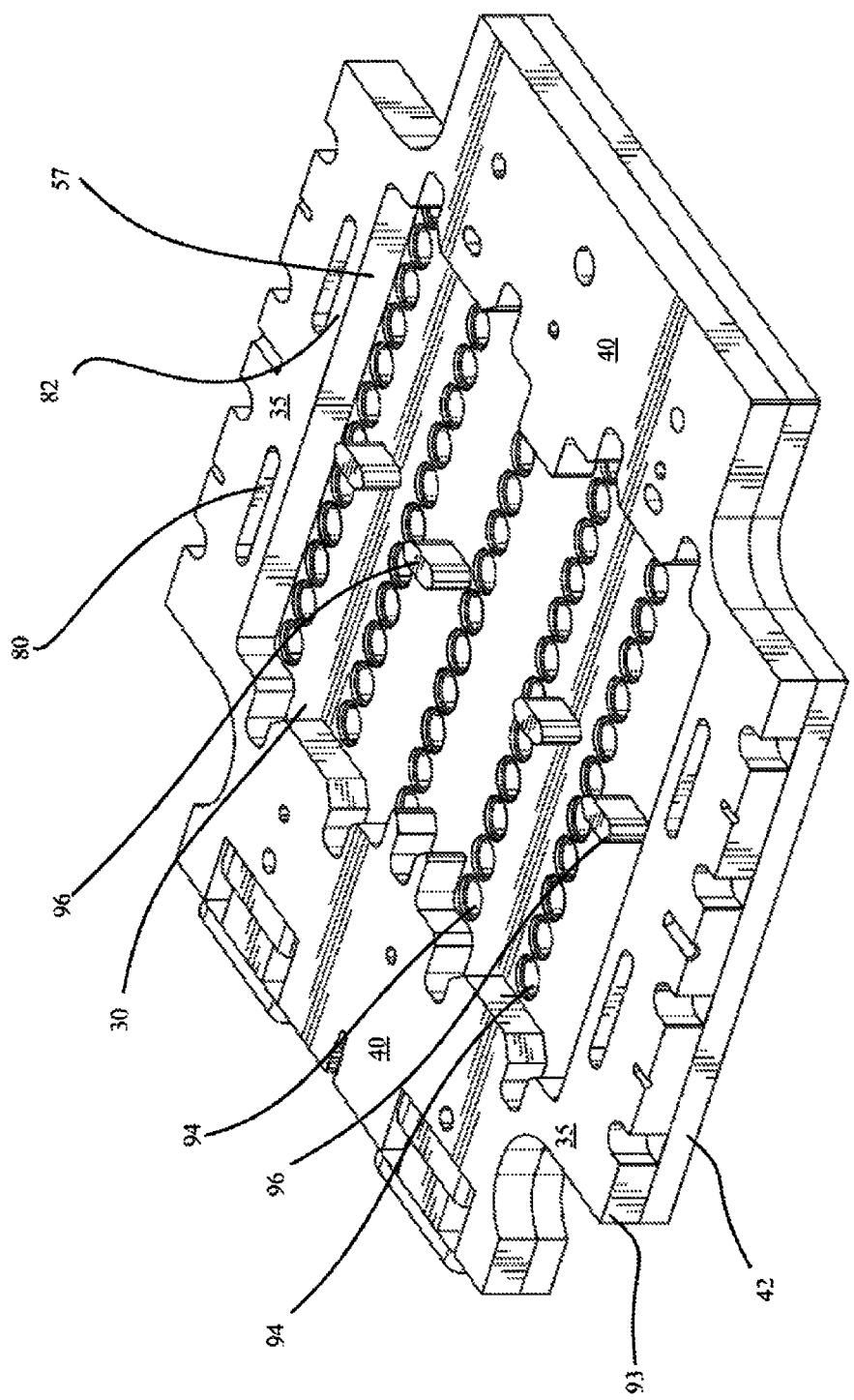
FIG. 2 is a perspective view of a mold plate in accordance with an embodiment hereof.

FIG. 1 is a top view of a hot runner apparatus generally shown at 10. Hot runner apparatus 10 comprises a mold plate 15, a bridge manifold 20, and sub-manifolds 25a ... 25d (generically referred to as sub-manifold 25 and collectively referred to as sub-manifolds 25). Mold plate 15 defines a pocket 30 (see FIG. 2) bounded by two pairs of opposing walls (the first pair, henceforth referred to as first walls 35 and the second pair, henceforth referred to as second walls 40) and manifold plate 42. Bridge manifold 20 is positioned, in pocket 30, between sub-manifolds 25 in a common plane.

Figure 3:
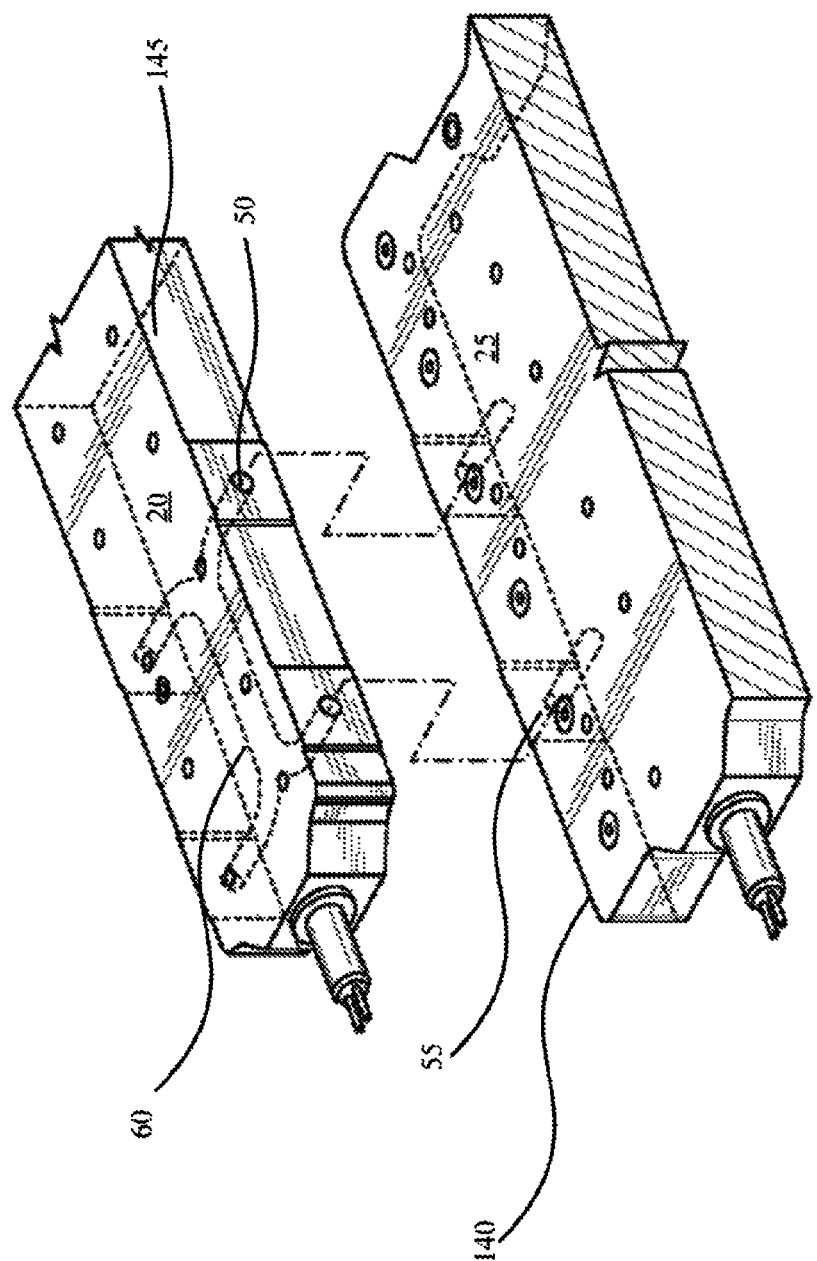
FIG. 3 is a perspective view of a portion of a bridge manifold and a portion of a sub-manifold showing the alignment of the bridge manifold and sub-manifold to create a junction in accordance with an embodiment hereof.
Figure 4:
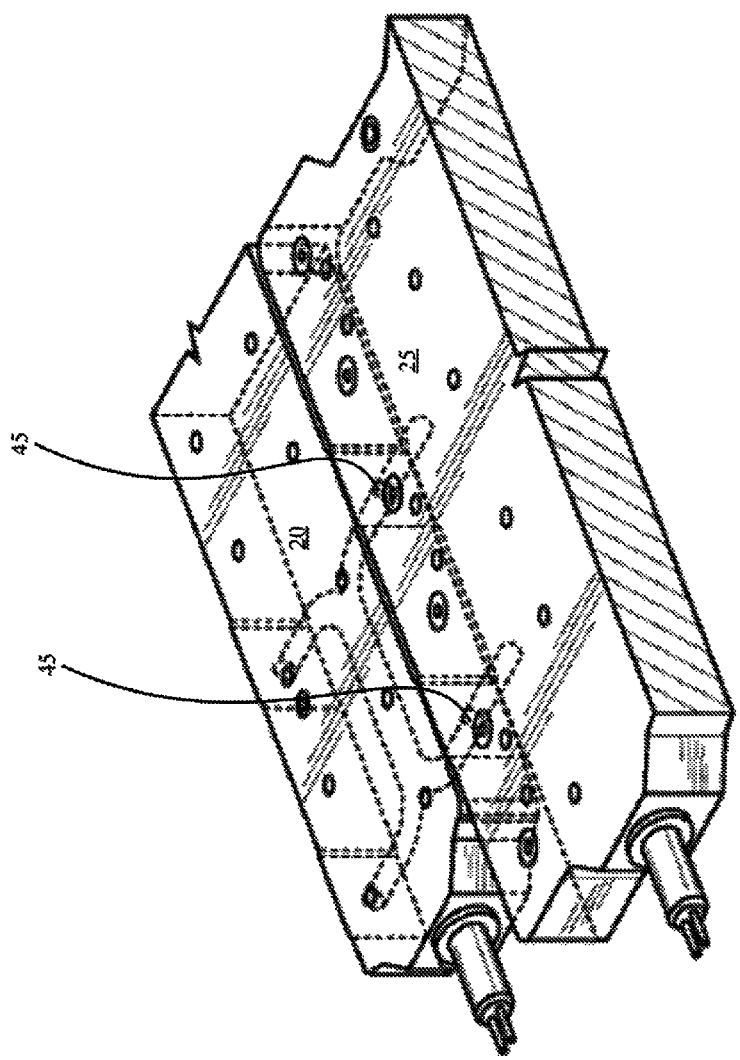
FIG. 4 is a perspective view of a portion of a bridge manifold and a portion of a sub-manifold showing the junction in accordance with the embodiment of FIG. 3.

Each of sub-manifolds 25 is coupled to bridge manifold 20 to receive a melt from bridge manifold 20 via a junction 45 between a bridge-manifold opening 50 and a sub-manifold opening 55 (see FIG. 3 and FIG. 4). Junction 45 is formed by aligning bridge-manifold opening 50 and sub-manifold opening 55 and urging them together, when bridge manifold 20 and sub-manifolds 25 thermally expand urging sub-manifolds 25 against bridge manifold 20 and contact regions 57a ... 57d (generically referred to as contact region 57 and collectively referred to as contact regions 57) of first walls 35. FIG. 3 depicts a portion of bridge manifold 20 and a portion sub-manifold 25 in a perspective view to illustrate the alignment of bridge-manifold opening 50 and sub-manifold opening 55. FIG. 4 depicts a portion of bridge manifold 20 and a portion of sub-manifold 25 in a perspective view to illustrate the junctions after bridge-manifold opening 50 and sub-manifold opening 55 are urged together when bridge manifold 20 and sub-manifolds 25 thermally expand urging sub-manifolds 25 against bridge manifold 20 and contact regions 57 (see also FIG. 3). Bridge-manifold opening 50 can comprise an opening of a network of melt channels (henceforth referred to as bridge-manifold-melt network 60) within bridge manifold 20. Sub-manifold opening 55 can comprise an opening of a network of melt channels (henceforth referred to as sub-manifold-melt network 65) within each of sub-manifolds 25.

Figure 5:
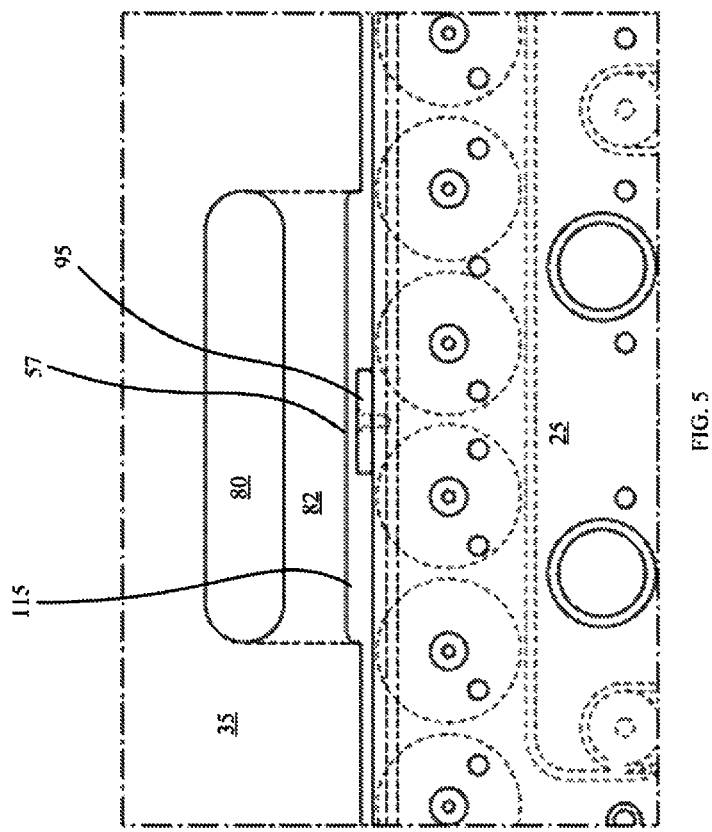
FIG. 5 is a top view of a portion of a wall of a mold plate and a portion of a sub-manifold before the sub-manifold is urged against the wall in accordance with an embodiment hereof.
Figure 6:
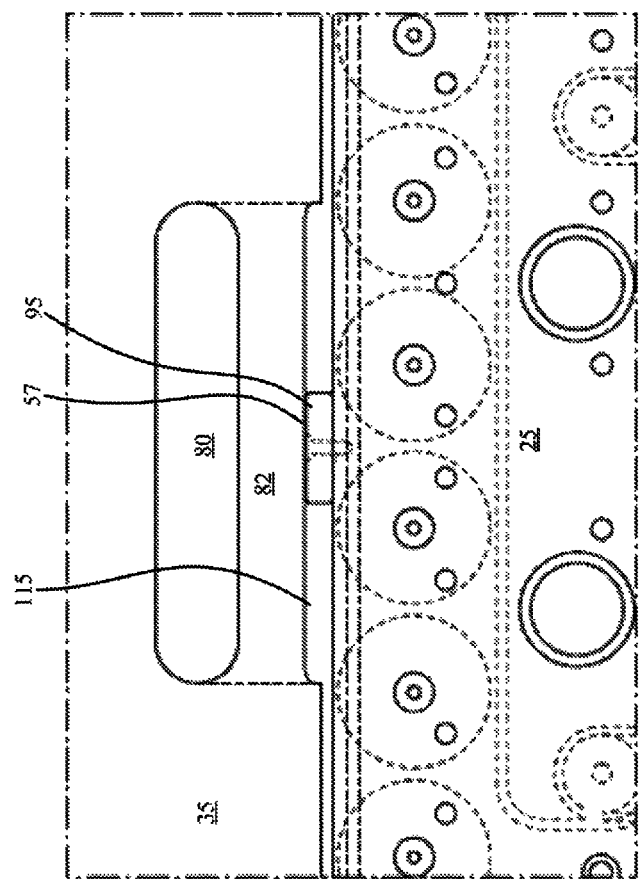
FIG. 6 is a top view of a portion of a wall of a mold plate and a portion of a sub-manifold after the sub-manifold is urged against the wall in accordance with the embodiment of FIG. 5.

FIG. 5 is a top view of a portion of hot runner apparatus 10 showing sub-manifold 25 spaced from first walls 35 prior to sub-manifolds 25 being urged into first walls 35 due to thermal expansion of bridge manifold 20 and sub-manifolds 25. FIG. 6 is showing the same portion as shown by FIG. 5 except after sub-manifolds 25 have been urged against first walls 35 due to thermal expansion of bridge manifold 20 and sub-manifolds 25.

In operation, bridge manifold 20 distributes, via bridge-manifold-melt networks 60, a melt (not shown) from a melt source (not shown) to sub-manifolds 25. Sub-manifolds 25, in turn, distribute, via sub-manifold-melt networks 65, the melt from bridge manifold 20 to a plurality of nozzles (not shown). In the embodiment shown by FIG. 1, bridge manifold 20 comprises one inlet 67, a network 60, and 8 outlets 69, feeding 4 sub-manifolds 25 each having 2 inlets, and 8 sub-manifold-melt networks 65 feeding individual nozzles (not shown). Configurations will vary depending on the application.

First walls 35 define hollow regions 80a ... 80d (generically referred to as hollow region 80 and collectively referred to as hollow regions 80). Each hollow region 80 is separated from respective contact regions 57 by a wall portion 82. The horizontal cross-sectional shape (i.e., looking into hollow region 80 from its opening) of hollow regions 80 can vary. However, having rounded corners rather than angled corners can reduce the risk of notches developing at the corners. Notches can develop into cracks when wall portion 82 bends to accommodate the thermal expansion of bridge manifold 20 and sub-manifolds 25. Some examples of horizontal cross-sectional shapes contemplated by the present application are: ellipse, elongated ellipse, rounded rectangle (i.e., rectangle with rounded corners, see FIG. 1, for example). Hollow regions 80 can reduce heat transfer from sub-manifolds 25 to mold plate 15 (i.e., hollow regions 80 function as thermal breaks for heat transferred from sub-manifolds 25 to first walls 35, at contact regions 57). Hollow regions 80 can also provide space for first walls 35, at contact regions 57, to compress into, when bridge manifold 20 and sub-manifolds 25 thermally expand against contact regions 57.

The thickness of wall portion 82 can vary. For certain implementations, the thickness can be at least 40 millimeters. Although pegs (not shown) under bridge manifold 20 and sub-manifolds 25 can resist rotation and lateral translations of bridge manifold 20 and sub-manifolds 25, in some configurations, first walls 35 can assist in resisting lateral translations of bridge manifold 20 and sub-manifolds 25 in the direction of first walls 35. In these implementations, wall portion 82 can be thick enough to provide the resistance needed to assist in resisting lateral translations of bridge manifold and sub-manifolds 25 in the direction of first walls 35. However, wall portion 82 cannot be so thick that it will resist sub-manifolds 25 to the point that damages contact pads 95 (i.e., contact pads 95 shattering). That is, wall portion 82 can be dimensioned to accommodate thermal expansion of sub-manifolds 25 but to resist lateral translations of sub-manifolds 25 and to reduce the risk of damaging contact pads 95 when sub-manifolds urge contact pads 95 against contact regions 57. (Further details of contact pads 95 are provided below.)

Figure 7:
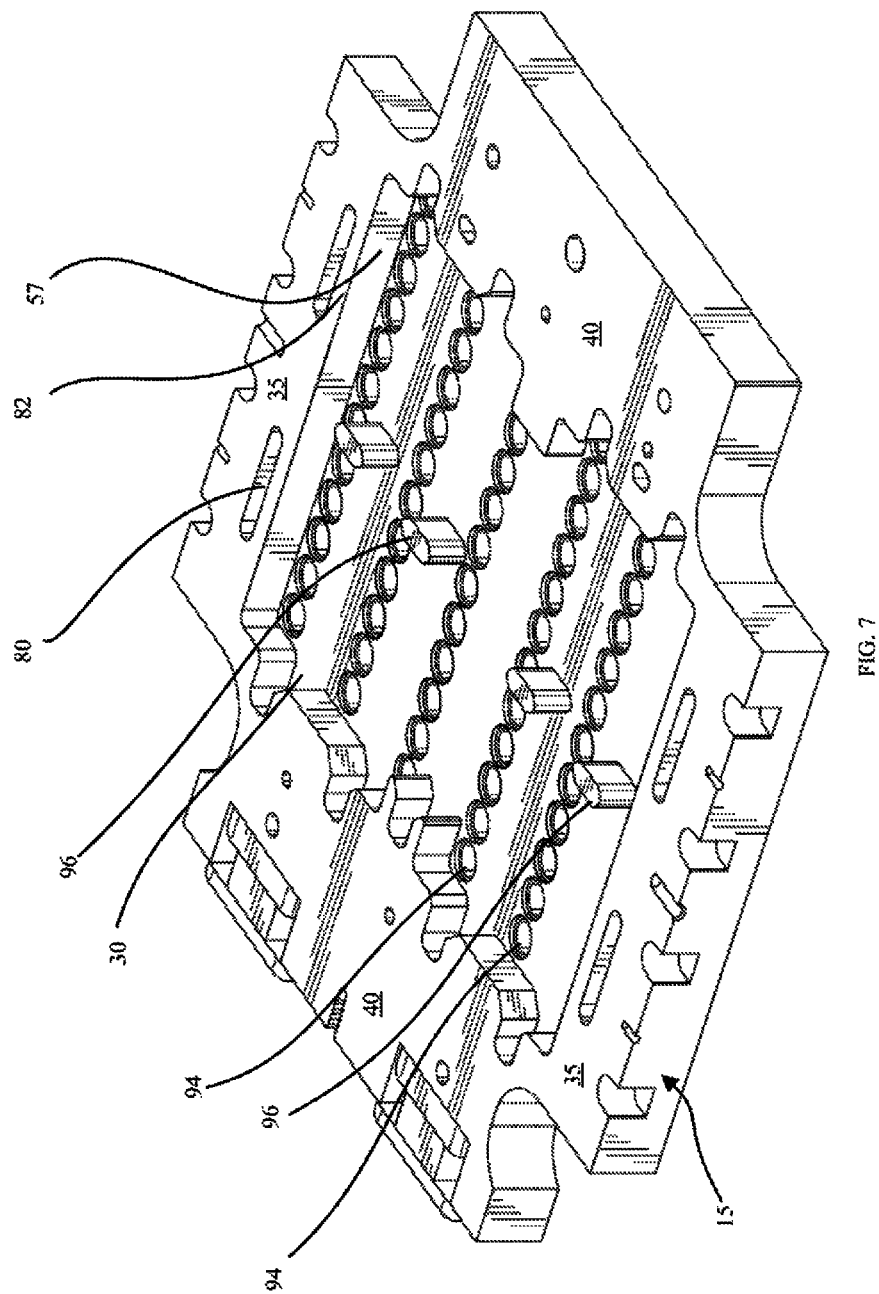
FIG. 7 is a perspective view of a mold plate in accordance with another embodiment hereof.

The embodiments depicted by the figures of the present application show one bridge manifold 20 and four sub-manifolds 25 mounted in mold plate 15. Hot runner apparatus 10 can include a greater number of plates and inserts depending upon the application. In some embodiments, mold plate 15 can be secured to a back plate (not shown) by bolts (not shown). In other embodiments, a hydraulic plate with valve members and actuating mechanism can be used to provide a valve gated system rather than a sprue gated system. In the embodiment depicted by FIG. 7, mold plate 15 comprises one plate with pocket 30 formed from mold plate 15 via milling, for example. In the embodiment depicted by FIG. 2, mold plate 15 comprises manifold plate 42 connected to a frame plate 93. Frame plate 93 forms a perimeter wall of pocket 30. Manifold plate 42 comprises bores 94 to receive nozzles (not shown). Pillars 96 extend between manifold plate 42 and the back plate (not shown) to absorb the pressure used to secure manifold plate 42 to the back plate to reduce the risk of that pressure being applied to sub-manifolds 25 and bridge manifold 20. In some embodiments, Pillars 96 can be attached to manifold plate 42, for example, by bolts (not shown). In other embodiments, Pillars 96 can be integral with manifold plate 42. The perimeter wall comprises first walls 35 and second walls 40. There are various methods to attach manifold plate 42 to frame plate 93. For example, manifold plate 42 can be bolted to frame plate 93. In some embodiments, such as the embodiment shown by FIG. 2, manifold plate 42 is a separate plate from frame plate 93. In other embodiments, such as the embodiment shown by FIG. 7, manifold plate 42 is integral with frame plate 93.

Contact pads 95a ... 95d (generically referred to as contact pad 95 and collectively referred to as contact pads 95) are positioned between wall portion 82 and respective sub-manifolds 25 at contact regions 57. Contact pads 95 can reduce physical contact between wall portion 82 and respective sub-manifolds 25 which in turn can reduce heat transfer from sub-manifolds 25 to first walls 35. As explained above, the heat transferred from sub-manifolds 25 to mold plate 15, via contact pads 95, is further reduced by hollow regions 80, which function as thermal breaks. In some embodiments, contact pads 95 are attached to wall portion 82. For example, in the embodiment depicted by FIG. 8, contact pads are attached to wall portion 82 using screws. In some embodiments, contact pads 95 are attached to sub-manifolds 25. In the embodiment depicted by FIG. 5, contact pads 95 are attached to sub-manifolds 25 using screws. In some embodiments, contact pads 95 comprise a material that is less thermally conductive than sub-manifolds 25 and mold plate 15. For example, contact pads 95 can comprise titanium and ceramic.

Figure 9:
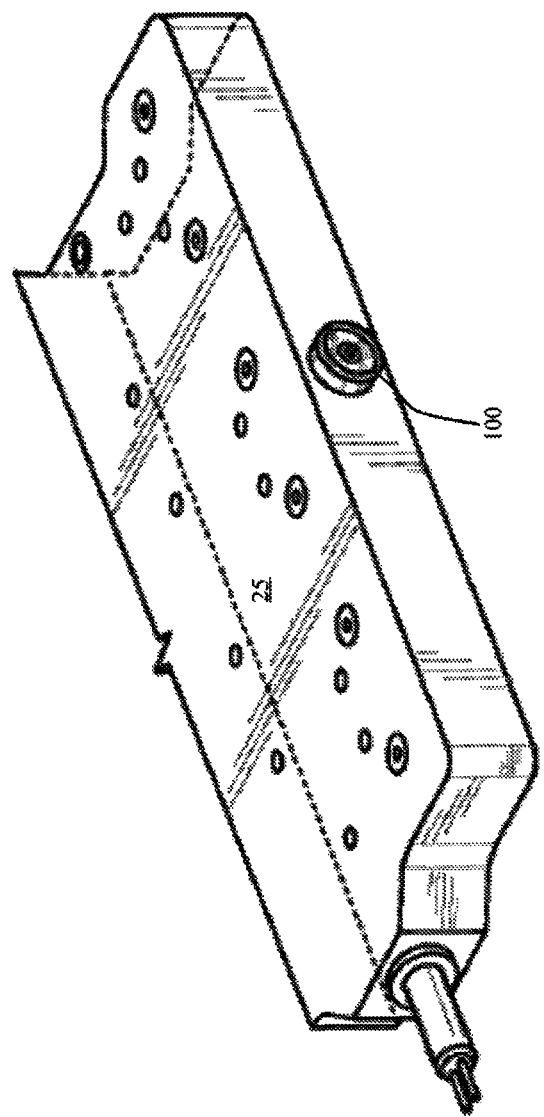
FIG. 9 is a perspective view of a portion of a sub-manifold with a contact pad in accordance with an embodiment hereof.
Figure 10:
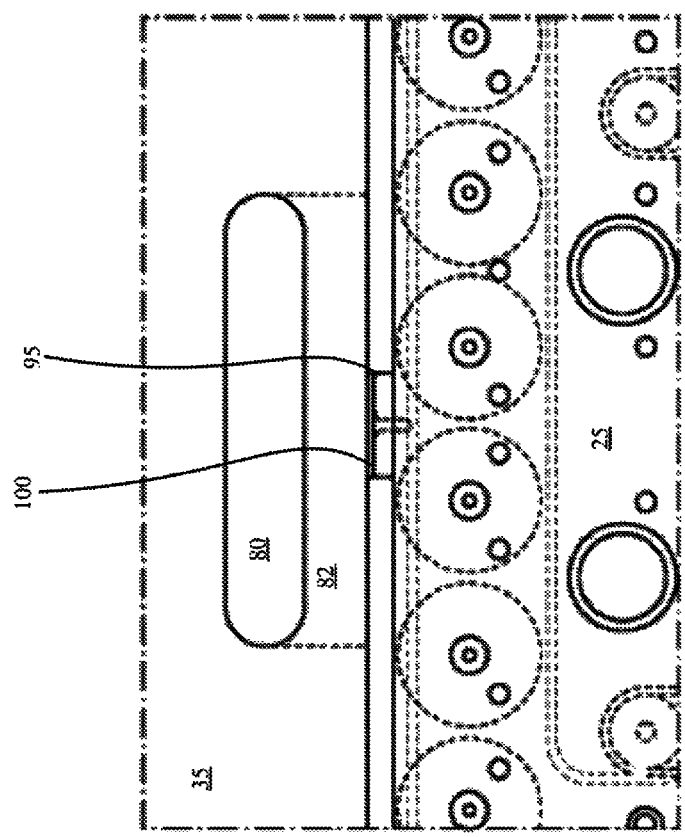
FIG. 10 is a top view of a portion of a wall of a mold plate and a portion of a sub-manifold after the sub-manifold is urged against the wall in accordance with the embodiment of FIG. 9.

In some embodiments, contact pads 95 comprise an annular portion 100 to abut a surface to reduce heat transfer from sub-manifolds 25 through contact pads 95 to the surface (see FIG. 9 and FIG. 10). For example, in the embodiments depicted by FIG. 9 and FIG. 10, annular portion 100 abuts first lateral surface of first walls 35. In some embodiments, annular portion 100 abuts a lateral surface of sub-manifolds 25 facing first lateral surface of first walls 35.

Figure 18:
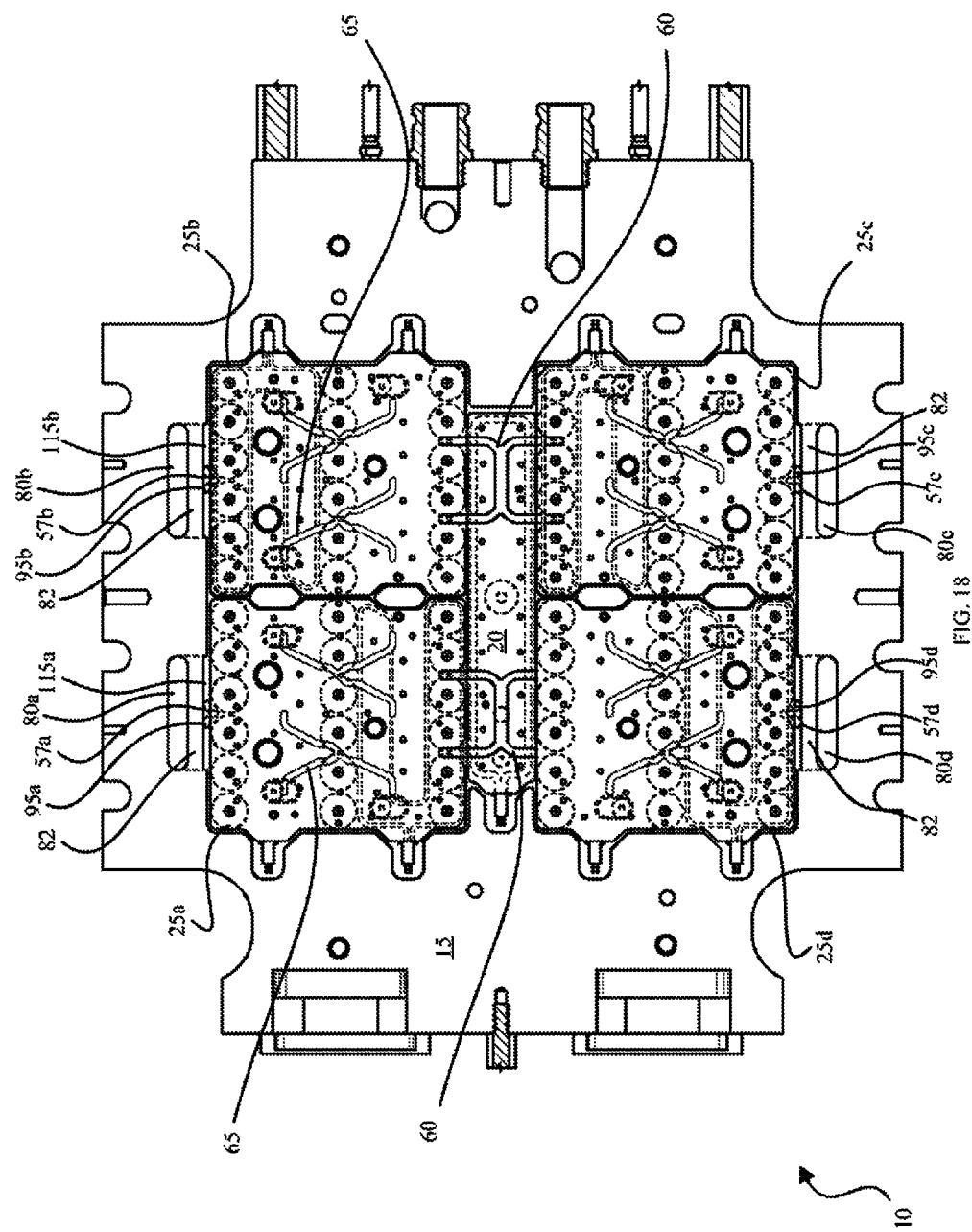
FIG. 18 is a top view a hot runner apparatus in accordance with another embodiment hereof.

In some embodiments, (see, for example, FIG. 5, FIG. 6, and FIG. 18), contact pads 95 are positioned between recesses 115a . . . 115d (generically referred to as recess 115 and collectively referred to as recesses 115), in first walls 35, at contact regions 57, and sub-manifolds 25.

Figure 11:
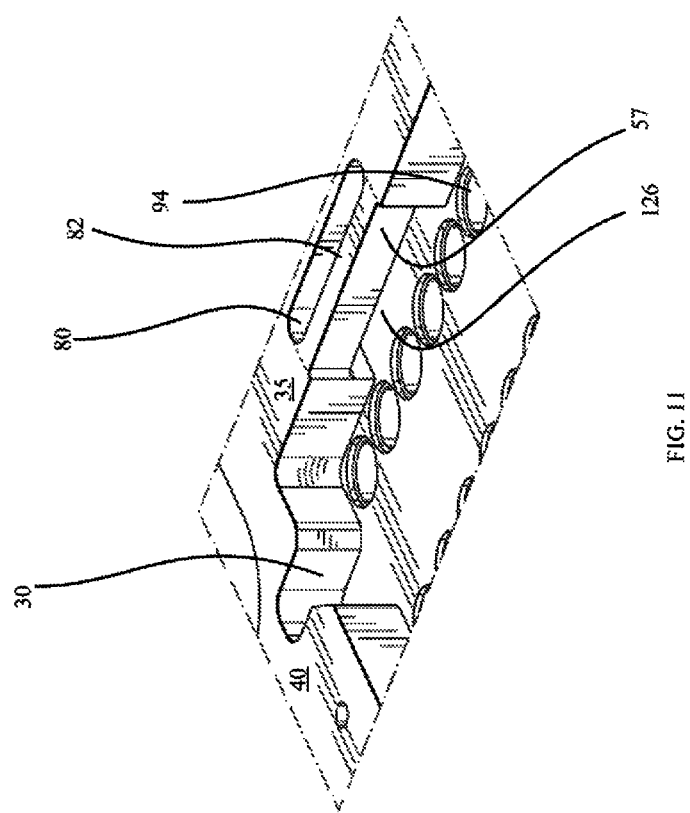
FIG. 11 is a perspective view of a portion of a mold plate in accordance with another embodiment hereof.

In the embodiment depicted by FIG. 11, hollow region 80 is in communication with pocket 30 via a cutout 126 in wall portion 82 distal from a top surface of wall portion 82. Cutout 126 allows wall portion 82 to bend more freely to accommodate the expansion of sub-manifolds 25. A person of ordinary skill in the art would appreciate that the qualifier "top" is used to help describe the location of cutout 126 and not used to limit the scope of the present application. In practice, hot runner apparatus 10 is mounted on a molding machine (not shown) with first walls 35 substantially parallel to a surface that supports the molding machine.

Figure 12:
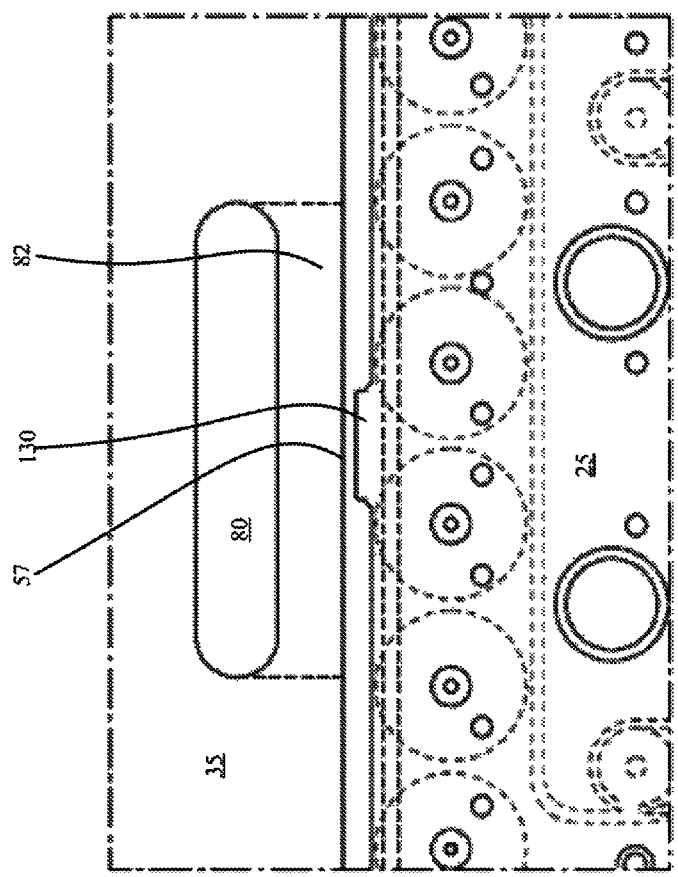
FIG. 12 is a top view of a portion of a wall of a mold plate and a portion of a sub-manifold before the sub-manifold is urged against the wall in accordance with yet another embodiment hereof.

In the embodiment depicted by FIG. 12, a sub-manifold protrusion 130 extends from respective sub-manifolds 25, sub-manifold protrusion 130 is urged against respective contact regions 57, when bridge manifold 20 and sub-manifolds 25 thermally expand.

Figure 13:
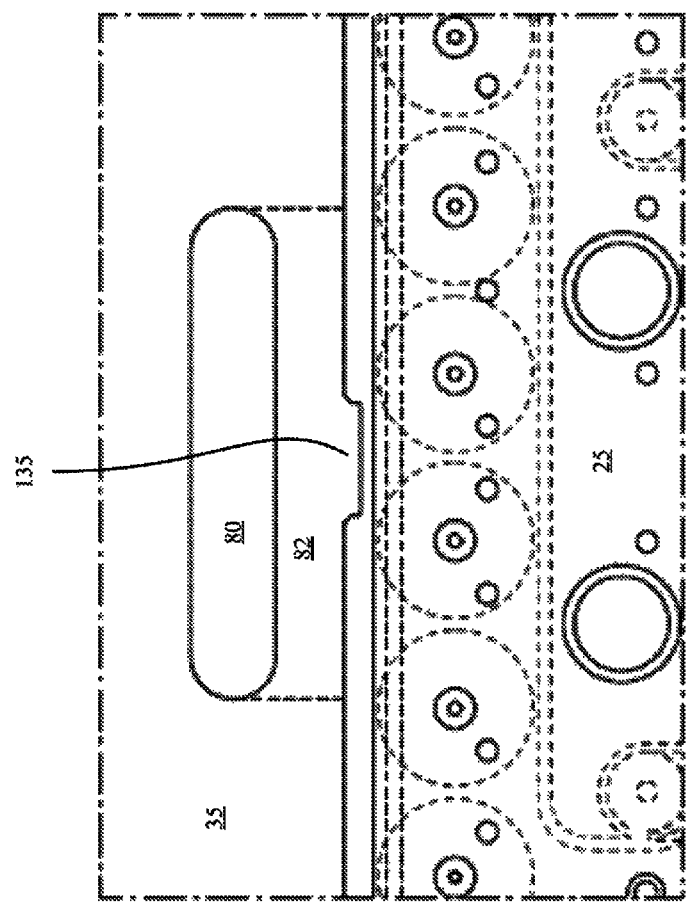
FIG. 13 is a top view of a portion of a wall of a mold plate and a portion of a sub-manifold before the sub-manifold is urged against the wall in accordance with yet another embodiment hereof.

In the embodiment depicted by FIG. 13, a wall protrusion 135 extends from wall portion 82; each of sub-manifolds 25 is urged against wall protrusion 135, when bridge manifold 20 and sub-manifolds 25 thermally expand.

Figure 14:
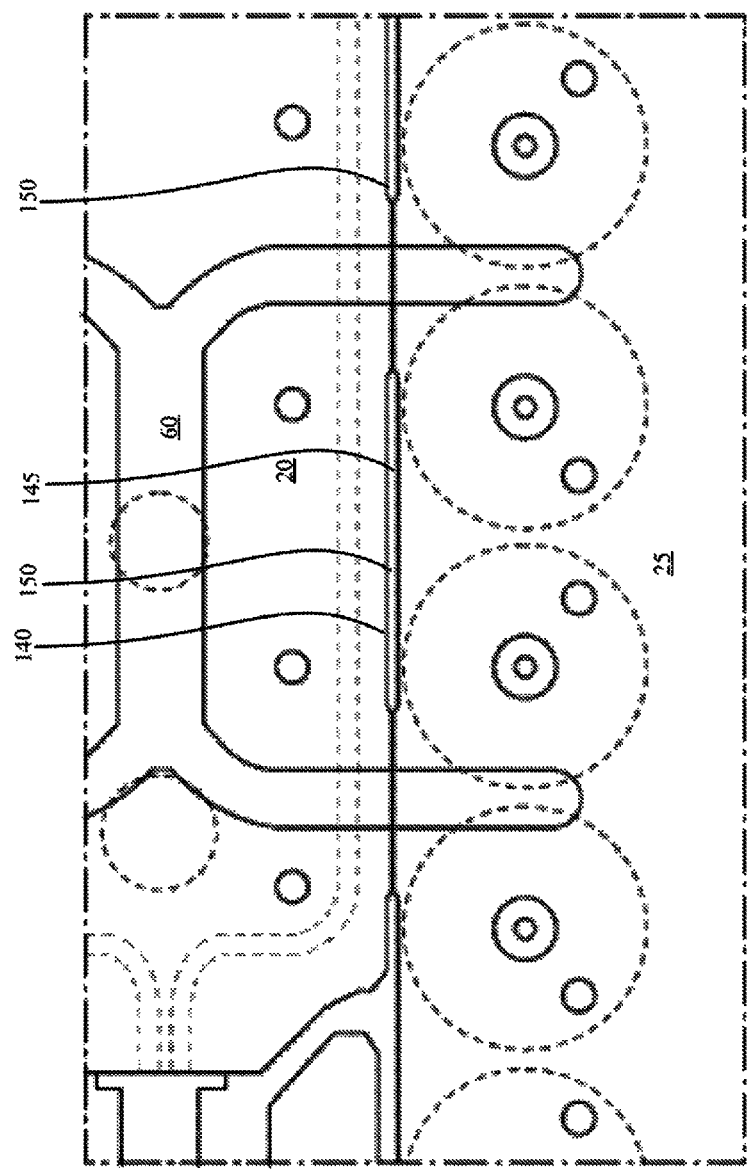
FIG. 14 is a top view of a portion of a bridge manifold and a portion of a sub-manifold showing gaps between a bridge manifold and a sub-manifold in accordance with an embodiment hereof.

In some embodiments, each of sub-manifolds 25 comprises a sub-manifold lateral surface 140 facing a bridge manifold lateral surface 145 (see FIG. 3 and FIG. 14) and when sub-manifold 25 abuts bridge manifold 20, sub-manifold lateral surface 140 and bridge manifold lateral surface 145 define at least one gap 150 between sub-manifold 25 and bridge manifold 20 (see FIG. 14).

Figure 15:
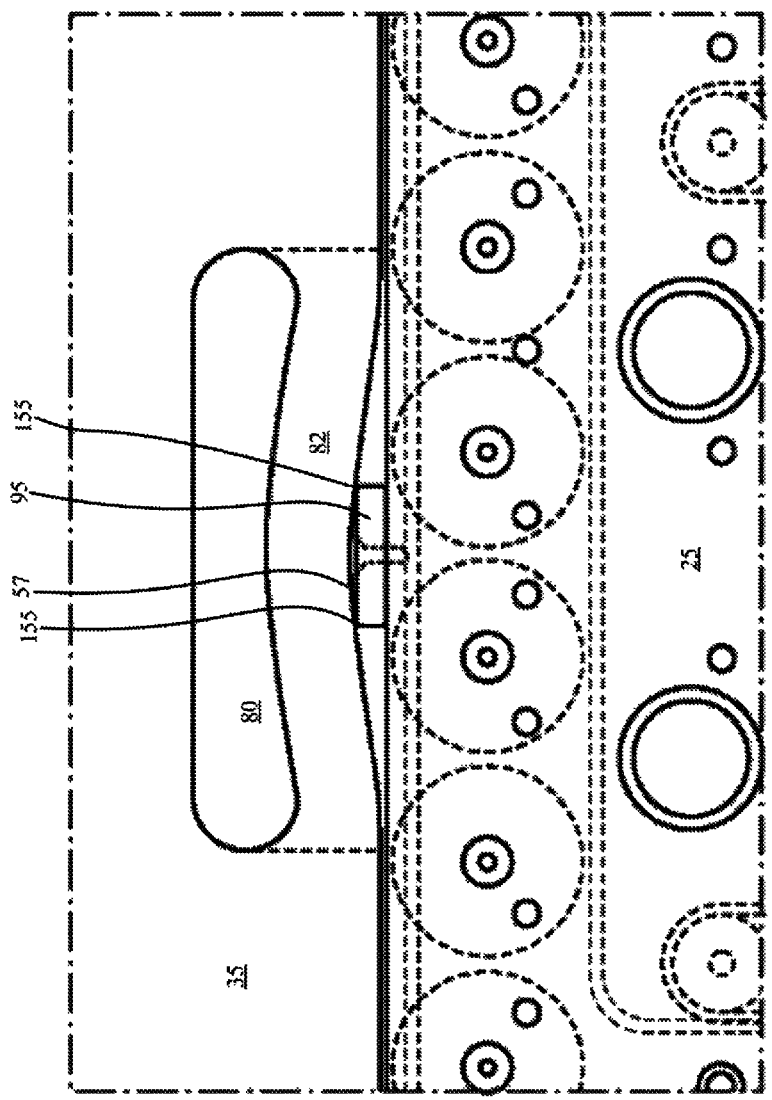
FIG. 15 is a top view of a portion of a wall of a mold plate and a portion of a sub-manifold showing a potential problem that could arise in certain applications.
Figure 16:
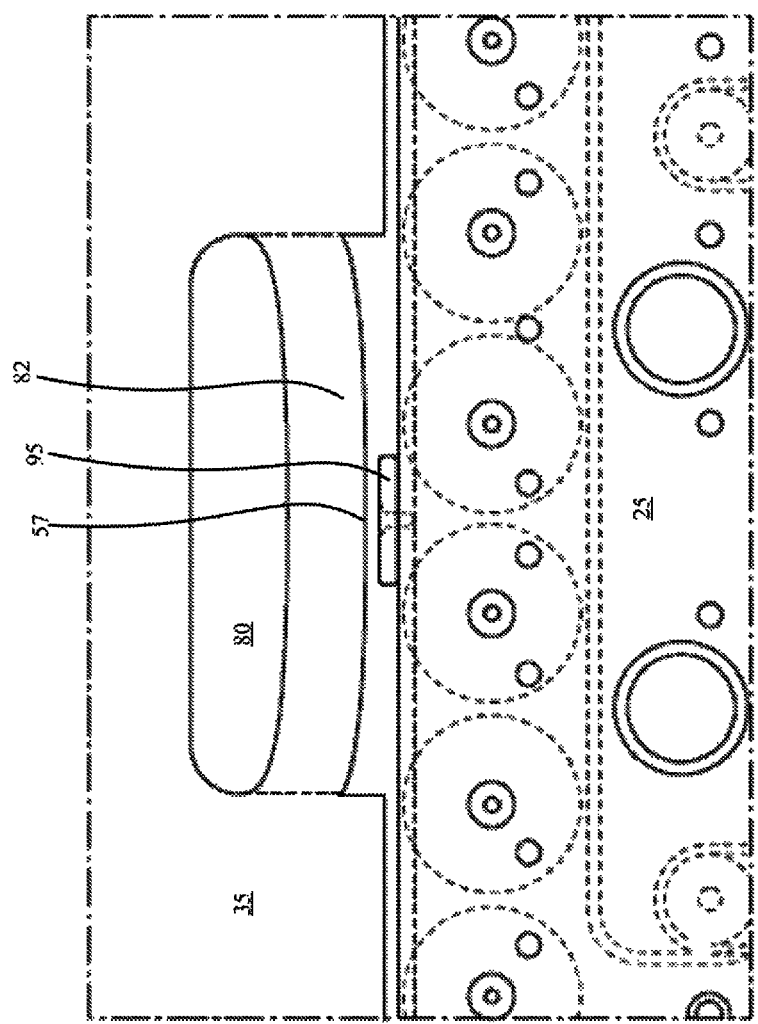
FIG. 16 is a top view of a portion of a wall of a mold plate and a portion of a sub-manifold before the sub-manifold is urged against the wall in accordance with yet another embodiment hereof.

In certain applications, when contact pad 95 is urged against wall portion 82, wall portion 82 can bow (i.e., concave towards sub-manifold 25) leaving contact pad 95 in contact with wall portion 82 at two corners 155 of contact pad 95 (see FIG. 15), which can result in a contact pad 95 digging into wall portion 82 at corners 155. To reduce the risk of the problem depicted by FIG. 15, wall portion 82 can be configured to be concave relative to hollow region 80 as shown by FIG. 16. By having wall portion 82 concave relative to hollow region 80, most, if not all, of contact pad 95 is in contact with wall portion 82, when sub-manifold 25 thermally expands into wall portion 82 (see FIG. 17), which reduces the risk of contact pad 95 digging into wall portion 82.

Figure 8:
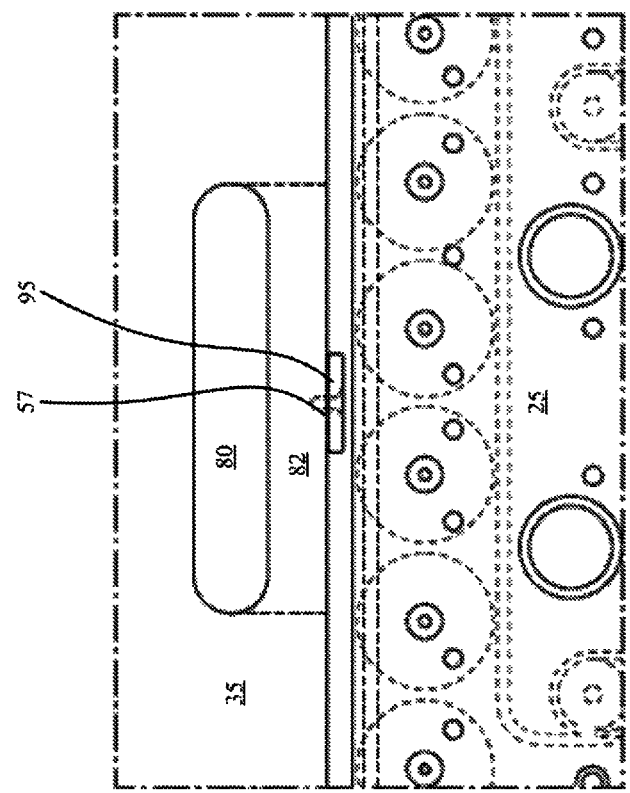
FIG. 8 is a top view of a portion of a wall of a mold plate and a portion of a sub-manifold before the sub-manifold is urged against the wall in accordance with another embodiment hereof.
Figure 17:
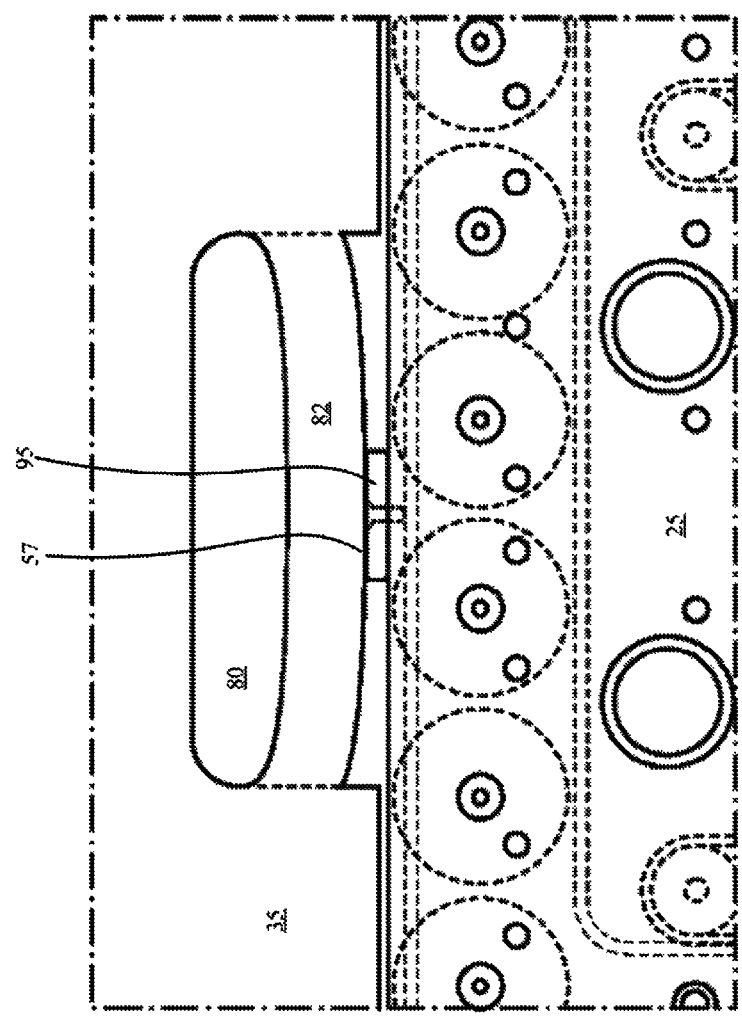
FIG. 17 is a top view of a portion of a wall of a mold plate and a portion of a sub-manifold after the sub-manifold is urged against the wall in accordance with the embodiment of FIG. 16.

The embodiment depicted by FIG. 16 and FIG. 17 can be combined with other embodiments such as those depicted by FIG. 8 (wherein contact pad 95 is attached to wall portion 82), FIG. 9 (wherein contact pad 95 comprises annular portion 100), FIG. 11 (wherein hollow region 80 is in communication with pocket 30 via a cutout 126 in wall portion 82 distal from a top surface of wall portion 82), FIG. 12 (wherein sub-manifold protrusion 130 extends from respective sub-manifolds 25), FIG. 13 (wherein wall protrusion 135 extends from wall portion 82), or combinations thereof.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. For example, the number of sub-manifolds 25 and bridge manifold 20 may vary depending on the application. Thus, the breadth and scope of the present invention should not be limited by the above-described exemplary embodiments, but should be defined only in accordance with the appended claims and their equivalents. It will also be understood that each feature of each embodiment discussed herein, and of each reference cited herein, may be used in combination with the features of any other embodiment.

What is claimed is:

1. A hot runner apparatus comprising:
a mold plate defining a pocket;
a plurality of sub-manifolds; and
a bridge manifold positioned in the pocket and between the sub-manifolds, the bridge manifold and the sub-manifolds oriented in a common plane, the bridge manifold for receiving a melt from a melt source, each of the sub-manifolds coupled to the bridge manifold to receive the melt from the bridge manifold via a junction between an opening of a network of melt channels within the bridge manifold and an opening of a network of melt channels within each of the sub-manifolds, the sub-manifolds being urged against the bridge manifold to form a seal therebetween when the bridge manifold and the sub-manifolds thermally expand urging the sub-manifolds against contact regions of a pair of opposing walls of the pocket, the respective opposing walls defining a hollow region separated from the respective contact regions by a wall portion.

2. The hot runner apparatus of claim 1, further comprising a contact pad positioned between the wall portion and the respective sub-manifold.

3. The hot runner apparatus of claim 2, wherein the contact pad is attached to the wall portion.

4. The hot runner apparatus of claim 2, wherein the contact pad is attached to the respective sub-manifold.

5. The hot runner apparatus of claim 2, wherein the contact pad comprises an annular portion for abutting a surface for reducing heat transfer through the contact pad to the surface.

6. The hot runner apparatus of claim 2, wherein the contact pad is positioned between a recess in the wall portion and the respective sub-manifold.

7. The hot runner apparatus of claim 6, wherein the hollow region is in communication with the pocket via a cutout in the wall portion distal from a top surface of the wall portion.

8. The hot runner apparatus of claim 2, wherein the contact pad comprises a material less thermally conductive than the respective sub-manifold and the mold plate.

9. The hot runner apparatus of claim 1, further comprising a protrusion extending from each sub-manifold, the protrusion being urged against the wall portion during thermal expansion.

10. The hot runner apparatus of claim 1, further comprising a protrusion extending from the wall portion, each sub-manifold being urged against the protrusion when the bridge manifold and the sub-manifolds thermally expand.

11. The hot runner apparatus of claim 1, wherein the wall portion is at least 40 millimeters thick.

12. The hot runner apparatus of claim 1, wherein each sub-manifold comprises a sub-manifold lateral wall facing a bridge manifold lateral wall when the respective sub-manifolds abuts the bridge manifold, the sub-manifold lateral wall and the bridge manifold lateral wall defining at least one gap between the sub-manifold and the bridge manifold.

13. The hot runner apparatus of claim 1, wherein the mold plate comprises a manifold plate connected to a frame plate, the frame plate forming a perimeter wall of the pocket, the perimeter wall comprising the opposing walls and another pair of opposing walls.

14. The hot runner apparatus of claim 1, wherein a horizontal cross-sectional shape of the hollow region comprises a rounded rectangle.

15. The hot runner apparatus of claim 1, wherein the wall portion is concave relative to the hollow region.

16. The hot runner apparatus of claim 15, further comprising a contact pad positioned between the wall portion and the respective sub-manifold.

17. The hot runner apparatus of claim 16, wherein the contact pad is attached to the wall portion.

18. The hot runner apparatus of claim 16, wherein the contact pad is attached to the respective sub-manifold.

19. The hot runner apparatus of claim 16, wherein the contact pad comprises a material less thermally conductive than the respective sub-manifold and the mold plate.

20. The hot runner apparatus of claim 15, wherein the hollow region is in communication with the pocket via a cutout in the wall portion distal from a top surface of the wall portion.

* * * * *

UNITED STATES PATENT AND TRADEMARK OFFICE
CERTIFICATE OF CORRECTION

PATENT NO.         : 8,690,563 B2
APPLICATION NO.    : 13/560320
DATED              : April 8, 2014
INVENTOR(S)        : Babin et al.

It is certified that error appears in the above-identified patent and that said Letters Patent is hereby corrected as shown below:

Title Page, Item (12) delete "Babin" and insert --Babin et al.--.

Title Page, Item (75) Inventor should read:
--(75) Inventors: Denis Babin, Georgetown (CA); Scott Gammon, Guelph (CA)--.

In the Claims

Column 6, lines 64-65 (claim 12): replace "respective sub-manifolds" with --respective sub-manifold--.

Signed and Sealed this
Sixteenth Day of June, 2015

Michelle K. Lee
*Director of the United States Patent and Trademark Office*